Nov. 10, 1953  E. C. KARP ET AL  2,658,746
TARE ADJUSTMENT DEVICE
Filed June 13, 1951
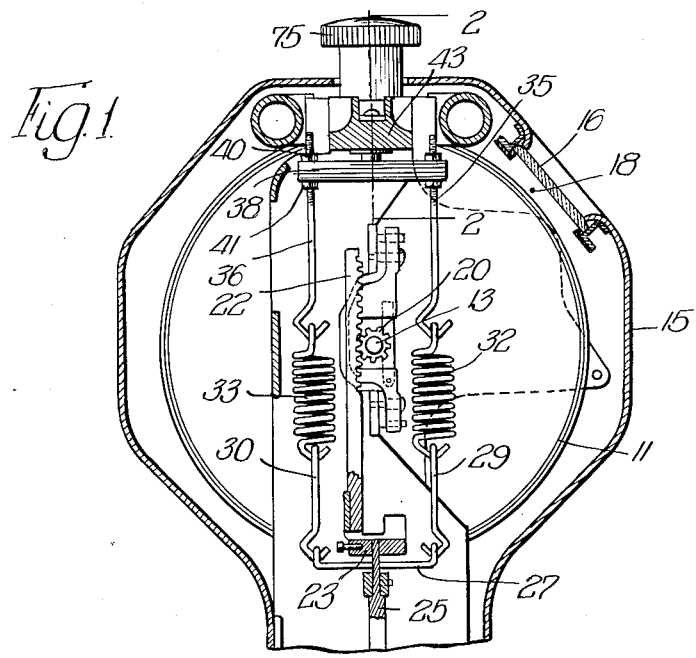
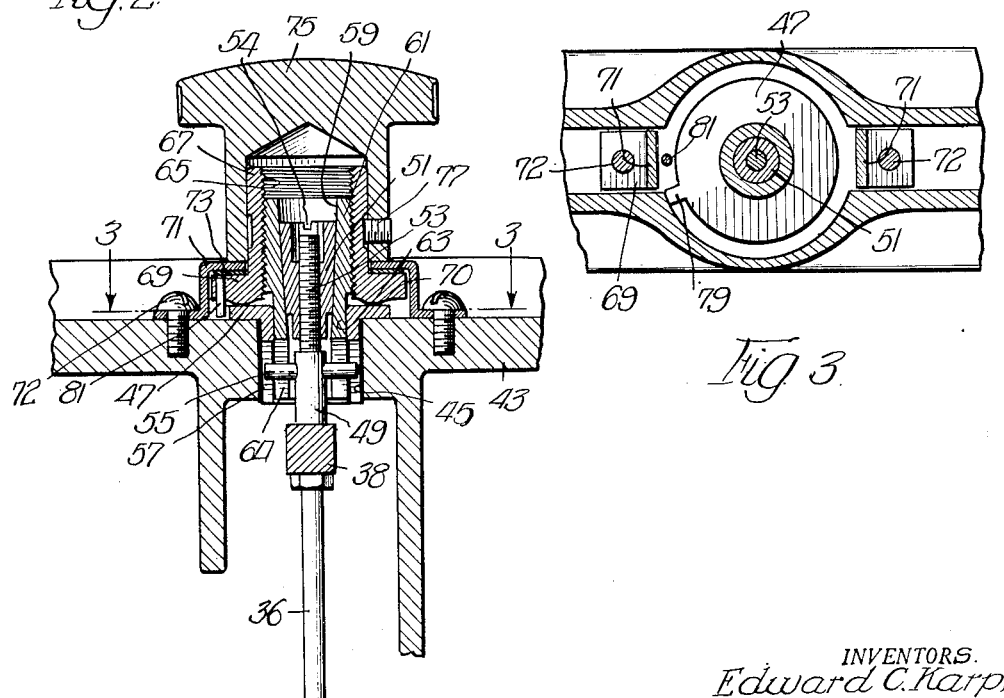
INVENTORS.
Edward C. Karp,
BY Sven G. Berglund Patented Nov. 10, 1953

2,658,746

UNITED STATES PATENT OFFICE 2,658,746

TARE ADJUSTMENT DEVICE

Edward C. Karp, Belvidere, and Sven G. Berglund, Rockford, Ill., assignors to Sanitary Scale Company, Belvidere, Ill., a corporation of Illinois Application June 13, 1951, Serial No. 231,296

6 Claims. (Cl. 265—68)

This invention relates to a new and improved tare adjustment for scales and more particularly to such an adjustment especially adapted for use with scales of the rotating drum type.

Scales of the rotating drum type are widely used in grocery stores, meat markets and other stores where goods are sold in variable quantities, which goods are sold by weight and price per unit of weight. The drums of such scales usually carry circumferentially extending weight indicia and parallel indicia indicating total prices at various prices per unit of weight. An indicating wire or sight line extends axially adjacent the outer face of the drum. It is necessary to provide a zero adjustment so that the sight line is opposite the zero marks on all the parallel indicia when there is nothing on the scale.

In weighing various materials, especially finely divided or granular materials, it is usual to place them on the scale in a container. It is necessary in such cases to subtract the weight of the container since it is not to be included in the weight on which the price is to be determined. In some constructions such a tare adjustment is accomplished by a movement of the zero adjustment device. This necessitates a careful readjustment of the zero device after every tare adjustment is made. It is also undesirable to have a zero adjustment which can be varied easily by a simple manual control readily available. The preferred practice is to have a zero adjustment which must be made by means of a screw driver or other tool and which may not be easily varied either intentionally or accidentally.

In the present construction the tare adjustment may be made without change of the usual zero adjustment and the tare adjustment may be returned to zero by moving an adjusting knob to bring parts against a positive stop. This avoids all care and time consuming adjustment in returning the scale to a correct zero reading.

It is an object of the present invention to provide a new and improved tare adjustment for scales.

It is a further object to provide such a construction adapted for use with scales of the rotating drum type.

It is also an object to provide such a construction combining zero and tare adjustments and in which the tare adjustment is made independently of the zero adjustment.

It is another object to provide such a construction in which the tare adjustment is returned to zero against a positive stop.

It is an additional object to provide an adjustment device of this character which is simple in design and construction and adapted for commercial production and use.

Other and further objects will appear as the description proceeds.

We have shown certain preferred embodiments of our invention in the accompanying drawings in which—

Figure 1 is a partial vertical section of a scale with the invention applied thereto;

Figure 2 is a vertical section, on an enlarged scale, taken on line 2—2 of Figure 1; and Figure 3 is a horizontal section taken on line 3—3 of Figure 2.

While the present construction may be used with various types of scales, it is particularly adapted for use with prepackaging scales such as shown in our application, Serial No. 228,250, filed May 25, 1951.

Figure 1 of the drawing shows the upper or drum portion of a usual type of scale, the showing being in cross section. The particular scale construction forms no part of the present invention, but a sufficient portion thereof is shown to bring out the application of the present invention to such a scale. The scale, as shown, comprises a drum 11 which is rotatable on a shaft 13, this shaft being suitably supported in bearings, not shown. The drum is enclosed in housing 15 having a sight opening 16 through which the drum may be observed and the weight and prices read against the sight line 18. The drum shaft 13 carries the gear 20 which meshes with the rack 22. This rack 22 is connected by transverse member 23 to a vertically extending connecting member 25 which connects to the mechanism moved by the goods upon the weighing platform.

The member 23 is also connected to a lower yoke 27 to the opposite ends of which are hooked the links 29 and 30. These links 29 and 30 are connected by springs 32 and 33 to the hangers 35 and 36 which are adjustably secured to the upper yoke 38 by means of adjusting nuts 40 and lock nuts 41. It will be apparent that through this construction, movement of the upper yoke 38 upwardly or downwardly is transmitted through rack 22 and gear 20 to the drum shaft 13 and the drum is caused to rotate. Consequently, an adjustment of the drum relative to the zero or sight line 18 opposite the sight opening 16 may be made by raising and lowering the upper yoke 38. The construction just described is that of a typical scale and the details thereof form no part of the present invention.

The present invention is shown in detail in Figures 2 and 3 where the scale frame 43 is shown as having an opening 45 into which the sleeve guide 47 is positioned with a press fit. This fit is tight enough to positively prevent rotation of the sleeve guide 47. The upper yoke 38 is shown as connected by vertically extending rod 49 to a rotatable supporting and zero adjusting member 51. This connection is by means of a threaded reduced upper portion 53 of the rod 49 which is threaded into the zero adjusting member 51. The cross guide and stop pin 55 extends through the rod 49, its ends fitting in vertical slots 57 in the sleeve guide 47 so as to prevent rotation of the rod 49. The outer face of member 51 is in the form of a cone and fits into a conical seat 59 formed in the tare adjustment sleeve 61. This sleeve has a reduced lower portion 63 fitting into the opening in the sleeve guide 47. This lower portion 63 is provided with slots 64 aligned with slots 57 and receiving the ends of the pin 55. The outer face of the tare adjustment sleeve 61 is threaded and coacts with the inner threaded face 65 of the tare adjustment collar 67. The lower portion of the tare adjustment collar 67 is shouldered outwardly to form flange 69 which is provided with a circumferentially extending rounded contact surface 70. This surface bears on the upper face of the sleeve guide 47. The hold down bracket 71 is secured to the scale frame 43 by means of screws 72 and retains the washer 73 against the upper face of the flange 69 on the tare adjustment collar 67. The tare adjustment knob 75 is secured to the tare adjustment collar 67 by means of a set screw 77.

Referring now to Figure 3, it will be seen that the upper flat portion of the sleeve guide 47 carries a radially extending stop lug 79. The flange 69 of the tare adjustment collar 67 carries a stop pin 81 adapted to engage the stop lug 79.

In the use of the construction shown, the scale is set so that the zero lines on the scales on drum 11 coincide with the sight line 18 by the adjustment of the zero adjusting member 51. To accomplish this the adjustment knob 75 is removed after loosening the set screw 77. A screw driver is then inserted in the upper end of the zero adjusting member 51 and fitted into the notches 54 formed in that member. Turning this member 51 in one direction will raise the rod 49 and yoke 38, while turning it in the opposite direction will lower the rod and yoke. By means of this screw driver adjustment the scale may be accurately set at zero. It is to be noted that this zero set is done with the tare adjustment collar 67 moved to its clockwise limit of movement with the stop pin 81 against stop lug 79.

After the zero adjustment is made the tare adjustment knob 75 is replaced and set screw 77 tightened. It will be apparent now that rotation of the knob 75 to move pin 81 away from stop 79 will cause the tare adjustment collar 67 to be rotated which will cause the tare adjustment sleeve 61 to rise and also cause the zero adjusting member 51 and yoke 38 to rise. This rise of the yoke 38 will cause the scale drum 11 to rotate in the clockwise direction, as seen in Figure 1, which means the scales will be rotated beyond zero. Therefore, placing a receptacle such as a box or bag on the scales will cause the drum 11 to rotate in the counter-clockwise direction which tends to restore the zero on the drum to a position opposite the sight line 18. The range of movement possible by a full rotation of the knob 75 is adequate to take care of the weight of any usual receptacle.

The normal operation is first to place the receptacle on the scale platform which, of course, will show the weight of the receptacle against the sight line 18. The knob 75 is then turned sufficiently to restore the zero lines to the sight line. Thereafter the goods being sold are placed in the receptacle and the correct net weight is read from the scale as it appears opposite the sight line. Once the weighing with any individual receptacle is completed the scale may be restored to its accurately adjusted zero position by counter-clockwise movement of the knob 75 which is stopped by engagement of pin 81 and lug 79 with the scale in exact zero adjustment. The zero adjustment is completely enclosed and cannot be tampered with except by removal of knob 75.

The tare adjustment may be quickly made after placing a receptacle on the scale by rotating knob 75 to bring the scale drum back to zero relative to the sight line. The scale is returned to zero adjustment by removing the tare adjustment which requires only a simple quick counter-clockwise movement which is positively stopped when exact zero is reached.

While we have shown certain preferred embodiments of our invention, these are to be understood to be illustrative only as it is capable of variation to meet differing conditions and requirements and we contemplate such modifications as come within the spirit and scope of the appended claims.

We claim:

1. In a scale construction, a rotatable indicating drum, means for rotating the drum, and adjusting means for moving the means rotating the drum, said adjusting means comprising a vertically movable rod, a zero adjusting member adjustably connected to the rod, and tare adjustment means associated with the zero adjusting member for jointly moving the rod and zero adjusting member.

2. In a scale construction, a rotatable indicating drum, means for rotating the drum, and adjusting means for moving the means rotating the drum, said adjusting means comprising a vertically movable rod, a rotatable zero adjusting member having a threaded connection to the upper portion of the rod, a tare adjustment sleeve supporting the zero adjusting member, and means for moving the tare adjustment sleeve vertically.

3. In a scale construction, a rotatable indicating drum, means for rotating the drum, and adjusting means for moving the means rotating the drum, said adjusting means comprising a vertically movable rod, a rotatable zero adjusting member having a threaded connection to the upper portion of the rod, a tare adjustment sleeve supporting the zero adjusting member, and means for moving the tare adjustment sleeve vertically, said means for moving the tare adjustment sleeve comprising a tare adjustment collar externally threaded on the tare adjustment sleeve.

4. In a scale construction, a rotatable indicating drum, means for rotating the drum, and adjusting means for moving the means rotating the drum, said adjusting means comprising a vertically movable rod, a rotatable zero adjusting member having a threaded connection to the upper portion of the rod, a tare adjustment sleeve supporting the zero adjusting member and means for moving the tare adjustment sleeve vertically, said means for moving the tare adjustment sleeve comprising a tare adjustment collar externally threaded on the tare adjustment sleeve, and stop means for limiting rotation of the tare adjusting collar.

5. In a scale construction, a rotatable indicating drum, a shaft for said drum, means engaging the shaft for rotating the drum, adjusting means for moving the means engaging the shaft to rotate the drum relative to zero position, said adjusting means comprising a vertically movable rod, a scale frame having an opening therein, a sleeve guide fixedly fitted in said opening, said sleeve guide being provided with vertical slots, the upper portion of the rod extending through the opening and provided with a cross pin fitting in said slots to prevent rotation of the rod, a tare adjustment collar bearing on the upper face of the sleeve guide, a tare adjustment sleeve threaded in the collar and having a slotted portion extending down in the sleeve guide, the cross pin fitting in said slots, the upper end of the rod being threaded and extending up into the tare adjustment sleeve, and a zero adjusting member rotatably carried in the sleeve and threaded on the upper portion of the rod.

6. In a scale construction, a rotatable indicating drum, a shaft for said drum, means engaging the shaft for rotating the drum, adjusting means for moving the means engaging the shaft to rotate the drum relative to zero position, said adjusting means comprising a vertically movable rod, a scale frame having an opening therein, a sleeve guide fixedly fitted in said opening, said sleeve guide being provided with vertical slots, the upper portion of the rod extending through the opening and provided with a cross pin fitting in said slots to prevent rotation of the rod, a tare adjustment collar bearing on the upper face of the sleeve guide, a tare adjustment sleeve threaded in the collar and having a slotted portion extending down in the sleeve guide, the cross pin fitting in said slots, the upper end of the rod being threaded and extending up into the tare adjustment sleeve, and a zero adjusting member rotatably carried in the tare adjustment sleeve and threaded on the upper portion of the rod, the sleeve guide member and the tare adjustment collar having coacting stop members to limit rotation of the tare adjustment collar.

EDWARD C. KARP.
SVEN G. BERGLUND.

References Cited in the file of this patent

UNITED STATES PATENTS

| Number | Name | Date |
|---|---|---|
| 902,769 | Sirch | Nov. 3, 1908 |
| 967,194 | Hopkinson | Aug. 10, 1910 |
| 1,623,820 | West | Apr. 8, 1927 |
| 1,628,781 | Jaenichen | May 17, 1927 |